UNITED STATES PATENT OFFICE.

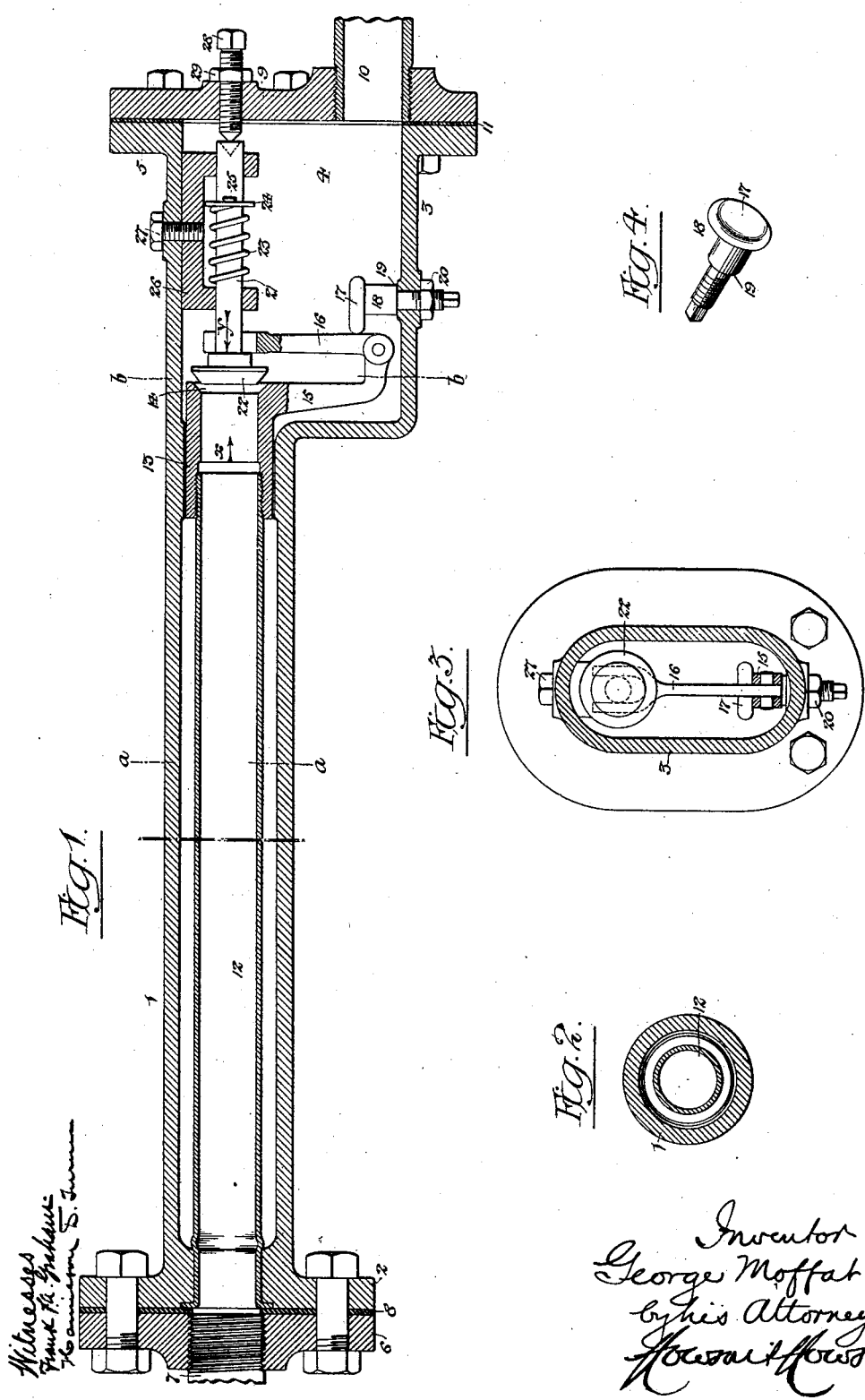

GEORGE MOFFAT, OF PHILADELPHIA, PENNSYLVANIA, ASSIGNOR TO JAMES SMITH AND COMPANY, INCORPORATED, OF CHARLESTON, WEST VIRGINIA, A CORPORATION OF WEST VIRGINIA.

STEAM-TRAP.

SPECIFICATION forming part of Letters Patent No. 697,349, dated April 8, 1902.

Application filed February 7, 1901. Serial No. 46,423. (No model.)

*To all whom it may concern:*

Be it known that I, GEORGE MOFFAT, a citizen of the United States, and a resident of Philadelphia, Pennsylvania, have invented certain Improvements in Steam - Traps, of which the following is a specification.

The object of my invention is to provide a steam-trap of the expansion class which shall be simple and cheap in construction, quick in action, and free from stuffing-boxes or other means for maintaining steam-tight joints between fixed and moving parts, the trap, moreover, being readily susceptible of regulation as to the extent of valve-opening permitted.

In the accompanying drawings, Figure 1 is a longitudinal section of a steam-trap constructed in accordance with my invention. Fig. 2 is a transverse section on the line $a\ a$, Fig. 1. Fig. 3 is a transverse section on the line $b\ b$, Fig. 1; and Fig. 4 is a perspective view of one of the elements of the trap.

The main casing of the trap is represented at 1 in Fig. 1, this casing being tubular throughout the greater portion of its length and having at one end a flange 2 and at the other end an enlargement 3, inclosing the discharge-chamber 4 of the trap and likewise flanged at the end, as shown at 5. The flange 2 of the casing is bolted or otherwise rigidly connected to a flange 6 upon the pipe 7, in connection with which the trap is intended to be used, suitable packing 8 being interposed between the two flanges in order to insure a steam-tight joint. The flanged end 5 of the enlarged portion 3 of the casing is closed by a cap-plate 9, which carries the discharge-pipe 10 of the trap, packing 11, interposed between said cap and flange, also forming a steam-tight joint at this end of the trap.

Flanged or otherwise rigidly secured to that end of the casing 1 opposite the enlargement 3 is the expansion-tube 12 of the trap, the free end of this tube carrying a tubular head 13, which projects into the delivery-chamber 4 of the trap and has at the end a valve-seat 14 and a projecting arm 15. Pivoted to this arm 15 is a lever 16, which has a bearing upon the head 17 of a stem 18, the latter being reduced in diameter, so as to form a shoulder 19 for bearing against the inner side of the casing 3, the reduced portion of the stem passing through an opening in said casing and being threaded for the reception of a nut 20, whereby the stem may be rigidly secured to the casing. The free end of the lever 16 is forked, so as to embrace the stem 21 of a valve 22, which is adapted to close against the seat 14 on the head 13 of the expansion-tube, the back of the valve having a bearing upon the lever 16, with which it is held in contact by the action of a coiled spring 23, which surrounds the stem 21 of the valve and bears upon a ring or washer 24, longitudinally confined to said stem by means of a transverse cotter-pin or key 25. The stem 21 of the valve is guided in a bracket 26, which is secured to the casing of the trap by means of a bolt 27, and the maximum opening movement of the valve is determined by a set-screw 28, which is adapted to a threaded opening in the cap-plate 9 and is provided with a lock-nut 29, whereby it may be securely held in position after proper adjustment. As shown in Fig. 1, the expansion-tube 12 is in its contracted condition, and the valve 22 is free from contact with the seat 14, so that a free discharge from the tube 12 into the delivery-chamber 4 of the trap and from the latter into the discharge-pipe 10 is permitted. As soon as the steam enters the tube 12, however, the latter is caused to expand longitudinally, thus moving the block 13 in the direction of the arrow $x$, this movement being transmitted to the valve 22 through the medium of the arm 15 and lever 16, so as to cause said valve to move in the direction of the arrow $y$, this latter movement being much in excess of the movement of the block 13 of the expansion-tube, owing to the difference in the length of the arms of the lever 16, this difference in the trap shown in the drawings being about as six to one. As the valve-seat 14 therefore moves in one direction and the valve 22 moves in the opposite direction, the movement for closing the valve is the sum of these two movements, and as the movement of the valve is much magnified a very quick closing of the same must result, and waste of steam will be thereby prevented, there being a correspondingly quick opening on the contraction of the tube 12, so that the trap is rendered very sensitive in its action.

It will be observed on reference to Figs. 1 and 4 that the head 17 of the stud 18, which constitutes the fulcrum for the lever 16, is eccentric in respect to the axis of said stud, so that by loosening the lock-nut 20 and turning the stud 18 by means of a suitable implement applied to the squared outer end of the same the fulcrum-bearing for the lever 16 may be caused to approach or recede from the axis of the stud 18, thereby regulating the extent of opening movement of the valve 22, the maximum opening movement being controlled by contact of the recessed end of the valve 21 with the conical inner end of the set-screw 28.

It will be noted that my improved trap contains but few parts, which are of simple construction, and as all the moving parts are contained within the main casing no stuffing-boxes or other means for packing joints between fixed and movable parts are necessary. Hence the trap, while of very effective character so far as its operation is concerned, can be made at low cost.

I do not claim, broadly, a steam-trap having an expansion-tube and a valve operated by the movement of the tube and having its motion augmented by an interposed lever connection, as such combination has before been devised; but

I claim as my invention and desire to secure by Letters Patent—

1. A steam-trap in which are combined a steam-tight casing, having an outlet therefrom, an expansion-tube contained entirely within said casing and having a valve-seat thereon, a valve adapted to said seat, a closed connection between said tube and casing, whereby the admission of steam into the space between the two is prevented, and lever mechanism interposed between the expansion-tube and the valve, also contained within the casing, and serving to transmit movement from the tube to the valve, substantially as described.

2. A steam-trap in which are combined a casing, an expansion-tube contained therein and having a valve-seat at its free end, a valve adapted to said seat, a lever interposed between the expansion-tube and the valve, and a stud rotatably mounted on the casing of the trap and having an eccentric head serving as a fulcrum for said lever, substantially as specified.

3. A steam-trap in which are combined a steam-tight casing, an expansion-tube contained therein, and having a valve-seat at its free end, a valve adapted to said seat, a lever interposed between the expansion-tube and said valve and also contained within the casing, and a set-screw for limiting the opening movement of the valve, substantially as specified.

In testimony whereof I have signed my name to this specification in the presence of two subscribing witnesses.

GEORGE MOFFAT.

Witnesses:
F. E. BECHTOLD,
JOS. H. KLEIN.